Figure 1:
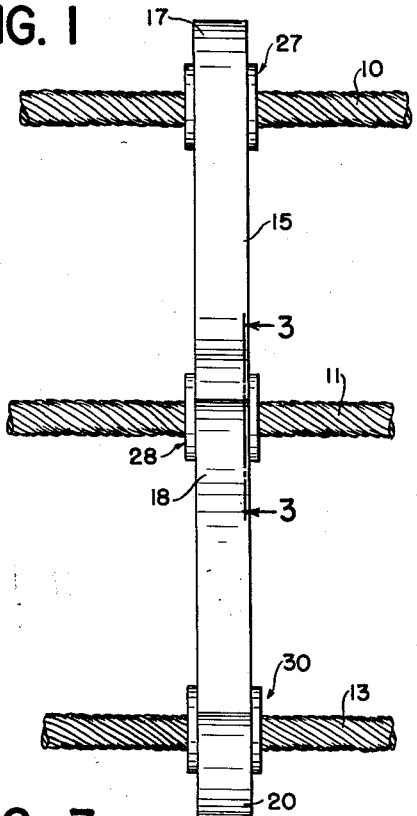

Feb. 5, 1963

V. F. VOLK ET AL 3,076,865

CABLE SPACING APPARATUS

Filed Aug. 11, 1959

2 Sheets-Sheet 1

INVENTORS
VICTOR F. VOLK
CHARLES D. EASH
JOHN W. OLSON
BY

ATTORNEYS

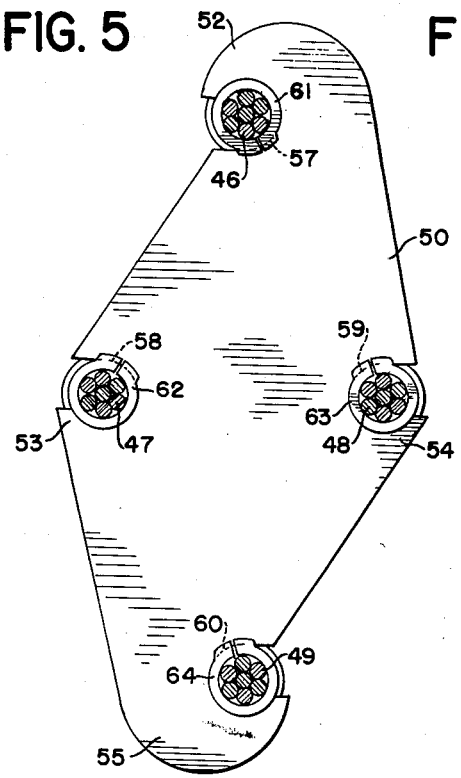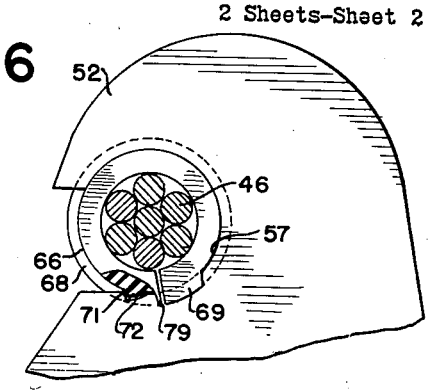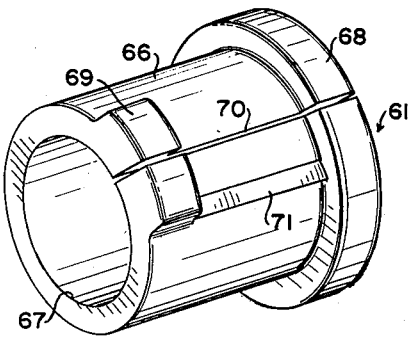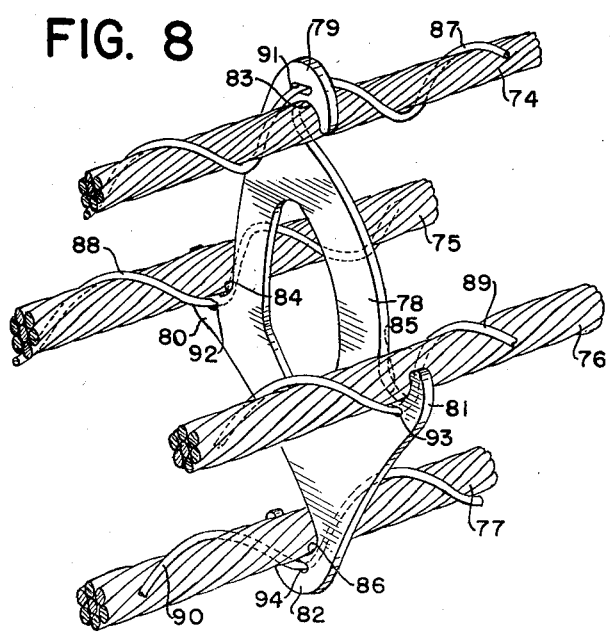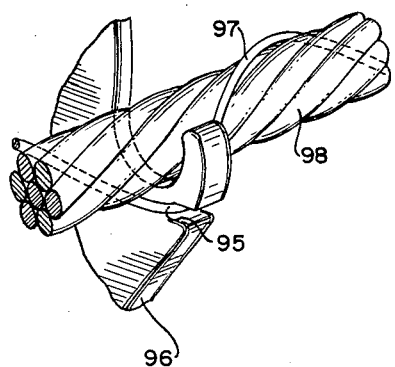
INVENTORS
VICTOR F. VOLK
CHARLES D. EASH
JOHN W. OLSON
ATTORNEYS United States Patent Office 3,076,865
Patented Feb. 5, 1963

3,076,865
CABLE SPACING APPARATUS
Victor F. Volk, Hastings on Hudson, N.Y., Charles D. Eash, Marion, Ind., and John W. Olson, Dobbs Ferry, N.Y., assignors to Anaconda Wire and Cable Company, a corporation of Delaware
Filed Aug. 11, 1959, Ser. No. 832,931
10 Claims. (Cl. 174—146)

This invention relates to apparatus for holding apart suspended portions of parallel aerial cables. The new cable spacing apparatus incorporates a body member of unitary construction, and separate gripping elements for disposition about the respective cables which can be attached securely to the body member.

Cable spacing apparatus according to the invention may advantageously be employed both to space aerial electric cables and to support them from a messenger cable. It is often more economical to utilize the new spacing and supporting apparatus and a messenger cable, so that the heavy electric cables can be relieved of some of their own weight and the towers can be spaced relatively far apart, than to have the conductor wholly self-supporting on relatively closely spaced towers. Moreover, the new spacing apparatus serves to hold the electric cables well separated from one another and lessens the likelihood of their coming together under high winds to cause a short circuit. Yet another advantage incident to the use of the new spacers is that they tie the spaced group of wires or cables together into an assembly which is less likely to develop objectionable oscillations in moderate to high winds than are individual wires or cables. In addition, the new spacers are of simple and economic construction and are designed with very little dirt-accumulating surfaces.

The improved spacing and supporting apparatus of the invention includes a body member of light unitary construction which does not contribute significantly to the load on the conductor or messenger cable, in combination with separate gripping members which can be attached to the respective cables individually and then, in turn, can be secured to the body member. The new apparatus can very easily be attached to and removed from the cables, and can readily be adapted to cables of various sizes. The body member is of sufficiently simple mechanical design so as to be easily stamped or cut from flat sheets or plates of dielectric material. The gripping members may be of any of a variety of simple designs well adapted to be made by standard molding or forming techniques, or from standard plastic shapes.

The new spacing apparatus comprises a unitary body member of dielectric material which is adapted to be positioned in a plane transverse to the suspended portion of a plurality of substantially parallel aerial cables. This body member has a plurality of spaced cable-supporting seats formed therein corresponding in number and spacing to and adapted to receive the respective cables. At least one of the seats is adapted to overlie its respective cable and the remainder are adapted to underlie their respective cables. A plurality of separate gripping elements are provided, one for each seat and each is adapted to closely encircle a length of the cable received in its associated seat. Locking means are formed in the body member adjacent the seat for engagement with the gripping element, for holding the cable releasably in the supporting seat; and each of the gripping elements is formed to define restraining means for engagement with opposite faces of the body member to prevent axial displacement of the cables relative to the body member.

Figure 2:
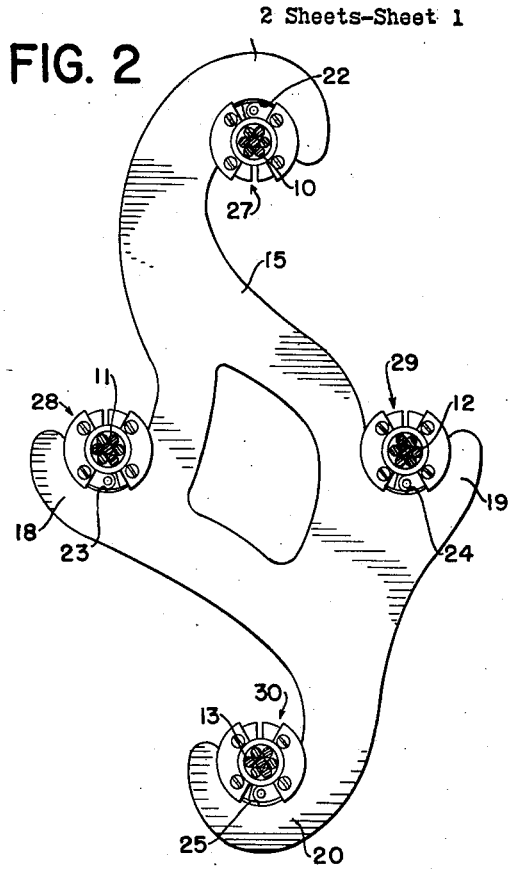
Figure 3:
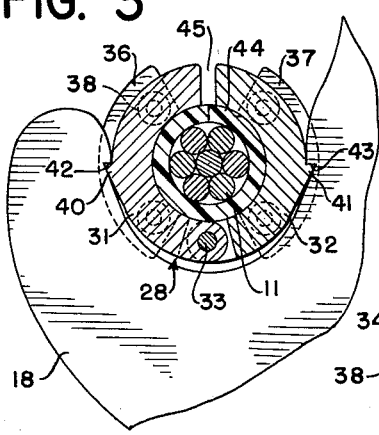
Figure 4:
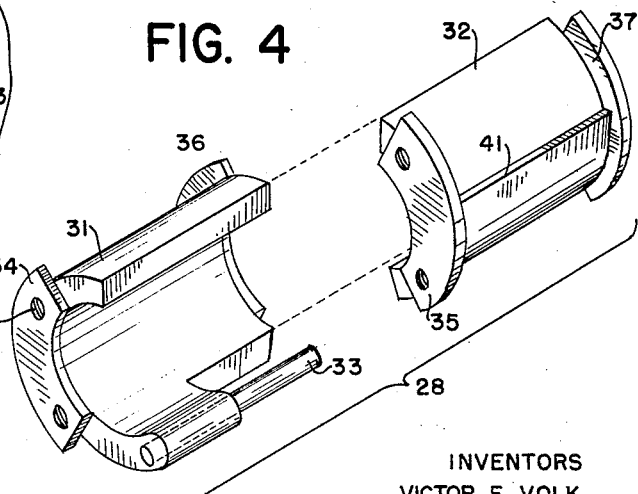

Preferred embodiments of the invention are described below with reference to the accompanying drawings, wherein FIG. 1 is a side elevation of one embodiment of the new spacing apparatus mounted in engagement with the aerial cables;
FIG. 2 is an elevation of the apparatus shown in FIG. 1;
FIG. 3 is a sectional view on an enlarged scale taken along the line 3—3 of FIG. 1;
FIG. 4 is a perspective showing disassembled the components of one of the gripping elements employed in the apparatus of FIGS. 1 to 3;
FIG. 5 is an elevation of a second embodiment of spacer apparatus according to the invention in position on an assembly of aerial cables;
FIG. 6 is a fragmentary view on an enlarged scale and partly broken away of that portion of the apparatus of FIG. 5 associated with the messenger cable;
FIG. 7 is a perspective on an enlarged scale of one of the gripping elements employed in the apparatus of FIGS. 5 and 6;
FIG. 8 is a perspective of another embodiment of the new spacing apparatus; and
FIG. 9 is an enlarged perspective of a form of locking means alternative to that provided in the apparatus of FIG. 8.

Referring first to FIGS. 1 and 2, suspended portions of a group of substantially parallel aerial cables are shown. This group consists of a messenger cable 10 and three electric cables 11, 12 and 13. Preferably, the messenger cable 10 is a steel strand which possesses sufficient tensile strength to support its own weight and the weight of the electric cables beneath it. For purposes of illustration, the electric cables 11, 12 and 13 are shown without insulating coverings though such coverings may be provided if desired.

This embodiment of the new spacing apparatus shown in FIGS. 1 to 4 includes a body member 15 of dielectric material which is adapted to be positioned in a plane transverse to the suspended portions of the cables 10–13. The body member 15 is of one-piece construction and can be cut or stamped from a flat sheet or plate of the dielectric material, since it may be of uniform thickness throughout and specially configured in outline only. It includes four curved cable-supporting portions 17, 18, 19 and 20 which correspond in number and spacing to the cables 10–13 respectively. (Shoulders may be added to the body member, at the respective cable-supporting portions, to increase their strength, in which event the body member would not be flat and would be molded to shape.) These cable-supporting portions 17–20 define cable-supporting seats 22, 23, 24 and 25 respectively which extend partially around their associated cables, leaving openings through which access is provided to each seat. Since the electric cables 11–13 are to be supported by the messenger cable 10, the seats 23–25 underlie the respective electric cables 11–13, whereas the seat 22 overlies the messenger cable 10, as shown in FIG. 2. The cable-supporting seats 22–25 are preferably of slightly oval shape with their long axis vertical so that their depth measured from a line across the access opening is a bit greater than their width measured along such line.

A plurality of separate gripping elements 27, 28, 29 and 30 surround the cables 10–13 and are received in the supporting seats 22–25. FIGS. 3 and 4 show in detail the gripping element 29 associated with the cable 11, which is typical of the other three also. It is a substantially cylindrical member which is longitudinally split into two substantially semi-cylinders 31 and 32 which are hinged together by means of pin 33. The outside diameter of the assembled cylindrical element is substantially equal to the width of the cable-supporting seat 23. Owing to the slightly oval shape of the supporting seat, the cylindrical gripping element 28 tends to be wedged into the seat 23 by the weight of the cable.

At opposite ends of each of the semi-cylinders 31 and 32, arcuate flange members 34, 35, 36 and 37 which are attached by means of fasteners 38 extend radially outwardly beyond the outer cylindrical surface. The length of each of the semi-cylinders 31 and 32 is such that the flanges 34 and 35 are spaced longitudinally from the flanges 36 and 37 a distance substantially equal to the thickness of the body member 15.

Longitudinally disposed on the respective semi-cylinders 31 and 32 are a pair of locking ridges 40 and 41 which, when the parts are assembled as shown in FIG. 3, are diametrically opposed to one another. These ridges are faired smoothly into the outer surface of the respective semi-cylinders on the hinged side thereof and on the other side rise sharply from the surface of the cylinder about one the same diameter to form locking faces. When the gripping elements are inserted in the supporting seats, the faired sides of the ridges face downwardly. Corresponding notches 42 and 43 are formed on opposite sides of the supporting seat 23 adjacent the access opening thereto, to engage with the locking faces of the ridges 40 and 41 respectively, as shown in FIG. 3.

A longitudinally split bushing 44 of rubber or other resilient material, which is adapted to be fitted about a length of the cable 11 adjacent the body member 15, also is provided. The inside diameter of the bushing 44 is made substantially equal to the outside diameter of the cable 11, and the outside diameter of the bushing 44 is made substantially equal to the inside diameter of the cylindrical gripping element 28. As is best shown in FIG. 3, the semi-cylinders 31 and 32 are each circumferentially shortened at their free edges so that when they are closed about the outside surface of the bushing 44 they leave a longitudinal gap 45.

In assembling the apparatus, the split resilient bushing 45 is first mounted on the cable 11, and then the gripping element 28 is closed about the bushing 44 with the gap 45 directed upwardly, as shown best in FIG. 3. The seat 23 of the body member is then brought up under the gripping element 28 between the flanges 34—35 and 36—37 thereon, and the gripping member is passed through the access opening and pressed into the seat 23 until the ridges 40 and 41 snap into the respective notches 42 and 43. It is possible to force the gripping member into the seat in this manner even when the body member and gripping element both are of hard non-resilient material because the resilient bushing 44 within the gripping element compresses, permitting the outside diameter of the assembled semi-cylinders 31 and 32 to be reduced enough to permit the gripping element to be securely seated.

It is to be noted that all the gripping elements are seated similarly, except that the gripping element 27 associated with the messenger cable 10 is inverted relative to the others.

When assembled with all the cables in the group, the new spacing apparatus described above transfers the weight of the electric cables 11–13 to the messenger cable 10. Also it holds the cables securely in their proper spaced position because the locking engagement of the ridges 40, 41 in the grooves 42, 43 prevents dislodgement of the gripping elements from the seats in which they are received, and axial displacement of the gripping elements relative to the body member is prevented by means of the flanges on the gripping elements which engage the opposite faces of the body member.

A particular advantage of the above-described spacing apparatus is that the body member and gripping elements may all be of one standard size, and by selecting bushings 44 of the proper wall thickness, cables of any diameter may be securely clamped in place.

Turning now to the embodiment of the apparatus shown in FIGS. 5 to 7, a group of four substantially parallel aerial cables is shown including a messenger cable 46 and three electric cables 47, 48 annd 49. For purposes of illustration, the electric cables 47–49 are shown without insulation though they could if desired be covered with a layer of insulation.

The apparatus comprises a body member 50 which can be formed from ordinary flat sheet dielectric material, since it need be specially configured in its outline only. The body member includes four curved cable-supporting portions 52, 53, 54 and 55 corresponding in number and spacing to the four aerial cables 46 to 49 respectively. (Again, shoulders may extend from the body member at its cable-supporting portions.) Circular cable-supporting seats 57, 58, 59 and 60 are defined by these portions 52–55 respectively, and at the periphery of each circular seat is formed an access opening which is narrower than the diameter of the seat but wider than the diameter of its associated cable. It will be noted that the seat 57 associated with the messenger cable 46 mainly overlies its cables, while the seats 58–60 associated with the electric cables 47 to 49 mainly underlie their respective cables.

Four separate substantially cylindrical gripping elements 61, 62, 63 and 64 of rubber or other resilient material are provided. These gripping elements are adapted to be associated with the cables 46 to 49 respectively. The construction of the four gripping elements is shown most clearly in FIGS. 6 and 7, particularly showing the gripping element 61 which, however, is typical of all the other gripping elements since they are substantially identical. The gripping element 61 includes a cylindrical body portion 66 having an outside diameter substantially equal to the diameter of the seat 57 in the body member 50, and an inside surface 67 of diameter substantially equal to the diameter of the cable 46.

At one end of the cylindrical body portion 66 a radially outwardly extending flange 68 is formed around the entire circumference of the gripping element 61. At the opposite end a radially outwardly extending flange 69 is formed around only a small portion of the circumference of that end of the gripping element. The longitudinal distance between the full and partial flanges 68 and 69 is substantially equal to the thickness of the body member 50 at the cable-supporting portions, and the circumferential length of the partial flange 69 is a little less than the width of the access opening at the periphery of the cable seat 57. The cylindrical body portion 66 is slit longitudinally as indicated at 70 so that it can be spread apart and snapped about the cable 46.

An integral longitudinal ridge 71 is formed on the cylindrical body portion 66. As shown in FIG. 6, a corresponding notch or groove 72 is formed in the seat 57 to engage with the ridge 71. Together they serve as locking means by which the gripping element is held in the seat 57.

In assembling the apparatus of FIGS. 5 to 7, the gripping element 61 is first spread open at the slit 70 and is mounted on the cable 46. The body member is then brought into a plane transverse to the cable so that the cable 45 may be passed laterally through the access opening in the seat 57 (the gripping element being disposed to one side of the body member, with the circumferentially short partial flange 69 facing toward it). The gripping element 61 is then slid along the cable toward the seat 57 with the partial flange in alignment with the access opening to the seat. Then the partial flange 69 is passed through the access opening while the body 66 of the gripping element is inserted into the circular seat until the full flange 68 abuts against the face of body member 50. The gripping element 61 is then turned counterclockwise (as viewed in FIG. 6) until the ridge 71 registers with and enters the groove 72. (A knurled or serrated surface may be formed on the periphery of the flange 68 to facilitate the turning of the gripping element 61.) In this position, the apparatus is fully assembled with axial displacement of the gripping element prevented by the flanges 68 and 69, and rotation prevented by the ridge-and-groove locking means 71 and 72.

In the apparatus specifically shown in FIGS. 5 to 7, it is possible to make the body member in standard sizes and to supply gripping elements of different inside diameters for different sizes of cables. Alternatively, the gripping elements 61 also may be made in standard sizes, and split resilient bushings similar to the bushings 44 of FIGS. 2 and 3 of different wall thickness may be provided to mount on cables of different sizes and present an outer surface of proper size to be received in the gripping element.

Referring now to the embodiment of the apparatus shown in FIGS. 8 and 9, four substantially parallel aerial cables are again arranged in a group, with a messenger cable 74 uppermost and three electric cables 75, 76 and 77 positioned therebeneath. As in the other embodiments, the electric cables 75–77 may, if desired, be covered instead of bare.

The apparatus comprises a body member 78 which may be formed from a flat sheet of rigid dielectric material, as it need be specially configured in outline only. The body member 78 includes four curved cable-supporting portions 79, 80, 81 and 82 which correspond in number and spacing to the cables 74–77 respectively. The several cable-supporting portions curve partially around the respective cables to form cable-supporting seats 83, 84, 85 and 86. The seat 83 overlies the messenger cable 74, and the other seats respectively underlie the electric cables 75–77. The access opening to each of the seats is wider than the diameter of the respective cables, and may be wide enough so that various size cables can be laid in the seats without difficulty.

In order to secure the cables in their seats, helical gripping elements 87, 88, 89 and 90 are associated with the cables 74–77 respectively. Each of these helical gripping elements is preferably of fairly stiff wire and has a pitch and inner coil diameter at least about equal to the diameter of the corresponding cable, so that it can be easily turned onto the cable by hand to the position shown in FIG. 8. Ideally, the pitch length from turn to turn of each helical gripping element is sufficiently greater than the diameter of the cable so as to be easily wound on to the cable, and the inside coil diameter of each gripping element prior to being wound onto the cable is a trifle less than the cable diameter so that when the gripping element has been assembled about the cable it grips the cable firmly. Rather than being pre-formed in helical shape, the gripping elements 87–90 may alternatively be pre-formed as straight bendable rods and then be turned about the cable into helical shape in the field.

The gripping elements may be of any desired material, such as stiff pre-formed metal rods, or of bendable metal rods which can be helically shaped on the job. For use in connection with high voltage cable it is particularly desirable to employ electrically insulating gripping elements, such as elements of non-metallic material, or of metal covered with non-metallic material.

Associated with each of the cable-supporting seats 83–86 are corresponding apertures 91, 92, 93 and 94 which extend through the body member adjacent the cable-receiving seats and which are large enough to permit the gripping elements to be inserted through them. The gripping elements can easily be threaded through the apertures as they are turned onto their respective cables. The apertures in cooperation with the helical gripping elements form locking means which secure the cables in their seats and prevent axial displacement of the body member relative to the cables.

The apertures may be holes 91–94 as shown in FIG. 8, or they may be peripheral slots cut into the body member adjacent the seat 83–86. As shown in FIG. 9, such a slot 95 is formed in a body member 96 and accommodates a helical gripping element 97 which is turned about a cable 98.

In either modification of this embodiment of the invention, the helical gripping element can easily be applied to its respective cable by hand fitting it into the aperture intended to receive it. The body member in this embodiment of the invention is of particularly simple construction since its cable-supporting seats can be formed without any grooves or ridges, and the helical wire gripping elements are very simple and inexpensive to make. It is therefore well suited for use where an inexpensive apparatus is desired.

We claim:

1. Apparatus for holding apart and supporting suspended portions of a plurality of substantially parallel aerial electric power cables relative to a parallel messenger cable comprising a unitary body member formed from a sheet of dielectric material and adapted to be positioned in a plane transverse to the suspended portion of said cables, said body member being configured to define a plurality of spaced cable-supporting seats corresponding in number and spacing to and adapted to receive the respective cables, one of said seats opening downwardly to overlie said messenger cable and the remainder of said seats opening upwardly to underlie the respective electric cables, a plurality of separate gripping elements cooperating with said seats and each adapted to encircle one of the respective cables along a length thereof extending through and for a short distance to each side of its supporting seat, a plurality of first locking means formed in said body member at each of said supporting seats and a plurality of second locking means formed in each of said gripping elements, said first locking means interengaging with said second locking means to hold the cables releasably in their seats, and restraining means on each of said gripping elements for engagement with opposite faces of said body member preventing relative axial displacement therebetween.

2. Apparatus for holding apart suspended portions of a plurality of substantially parallel aerial electric cables comprising a unitary body member of dielectric material adapted to be positioned in a plane transverse to the suspended portion of said cables, said body member including a plurality of spaced open cable-supporting seats corresponding in number and spacing to and adapted to extend partially around their respective cables, a plurality of separate longitudinally split and hinged rigid substantially cylindrical gripping elements, a pluarlity of split bushings of resilient material adapted to be fitted about a length of the respective cables adjacent the body member, said gripping elements being dimensioned to be closed tightly about said resilient split bushings and said open supporting seats being shaped and dimensioned to permit the closed bushings to be wedged tightly therein, longitudinally disposed mating ridge-and-groove locking means formed on each supporting seat and the outside surface of each gripping element and adapted to hold a gripping element releasably in each seat, and radially projecting flanges on opposite ends of each gripping element in position to engage opposite faces of said body member to prevent axial displacement of said gripping elements relative to said body member.

3. Apparatus for holding apart suspended portions of a plurality of substantially parallel aerial electric cables comprising a unitary body member of dielectric material adapted to be positioned in a plane transverse to the suspended portion of said cables, said body member defining a plurality of spaced substantially circular cable-supporting seats corresponding in number and spacing to the respective cables, each of said seats being configured to extend only partially around its respective cable and to define a peripheral opening through which a cable may be inserted into position to be supported on said seat, a plurality of separate substantially cylindrical longitudinally split gripping elements of resilient material adapted to fit closely about a length of each of said cables adjacent said body member, radially outwardly extending flanges on opposite ends of each of said gripping elements, one of said flanges on each gripping element being partial and extending around substantially less than half the circumference of its respective gripping elements, the openings in said supporting seats being wider than both the maximum chordal dimension of said partial flanges and the diameter of said cables and narrower than the outside diameter of said gripping elements between said flanges, and rotation-preventing mating locking means on the body member and each gripping element, whereby said gripping elements can be passed axially into engagement with said seats with the partial flange thereof foremost and can then be turned to a position where axial displacement relative to said body member is prevented by said flanges and rotation is prevented by said locking means.

4. Apparatus according to claim 3 wherein said locking means are longitudinally disposed mating ridge-and-groove means formed on each supporting seat and on the outside surface of each gripping element, the portion of said locking means on the gripping elements extending between the flanges thereof.

5. Apparatus for holding apart suspended portions of a plurality of substantially parallel aerial electric power cables comprising a unitary diamond-shaped, flat body member of dielectric material positioned in a plane transverse to the suspended portion of said cables, said body member including a single downwardly facing open seat supportable on a messenger and a plurality of upwardly facing open cable-supporting seats corresponding in number and spacing to the respective cables and extending partially around the respective cables, and a plurality of separate helical gripping elements cooperating with said body member each having a pitch length and inner diameter at least about as great as the diameter of one of said cables, said gripping elements being turned onto each of said cables adjacent said body member, said body member having a locking aperture through which one of the said gripping elements is passed formed therein adjacent each seat, whereby said gripping elements hold said cables in their seats and prevent axial displacement of said cables relative to said body member.

6. Apparatus according to claim 5 wherein said gripping elements are rods pre-formed into helical shape.

7. Apparatus according to claim 5 wherein said gripping elements are stiff but bendable rods turned about the respective cables into helical shape.

8. Apparatus according to claim 5 wherein said gripping elements are of non-metallic material.

9. Apparatus according to claim 5 wherein said gripping elements are metal rods covered with non-metallic material.

10. Apparatus for holding apart and supporting suspended portions of a plurality of substantially parallel aerial electric cables relative to a parallel messenger cable comprising a unitary body member formed from dielectric material and adapted to be positioned in a plane transverse to the suspended portion of said cables, said body member being configured to define a downwardly facing seat adapted to overlie said messenger and additionally to define a plurality of upwardly facing seats corresponding in number and spacing and adapted to underlie said cables, a pair of inwardly facing opposing ledges in each of said seats, a plurality of separate gripping elements each adapted to encircle one of the cables along a length thereof within its supporting seat, said gripping elements having at least two flat surfaces engaging the ledges of their respective seats whereby said gripping elements and the cables encircled therein are restrainedly held in said seats.

References Cited in the file of this patent

UNITED STATES PATENTS

| | | |
|---|---|---|
| 121,368 | Holley | Nov. 28, 1871 |
| 753,399 | Hunt | Mar. 1, 1904 |
| 1,553,244 | Jacobs | Sept. 8, 1925 |
| 2,202,538 | Selquist | May 28, 1940 |
| 2,275,019 | Peterson | Mar. 3, 1942 |
| 2,324,791 | McLoughlin et al. | July 20, 1943 |
| 2,820,083 | Hendrix | Jan. 14, 1958 |
| 2,839,597 | Hendrix | June 17, 1958 |
| 2,891,751 | Raypholtz | June 23, 1959 |
| 2,912,482 | Horrocks et al. | Nov. 10, 1959 |
| 2,927,147 | Flower | Mar. 1, 1960 |
| 2,934,587 | Duffy et al. | Apr. 26, 1960 |
| 2,959,632 | Peterson | Nov. 8, 1960 |
| 3,013,110 | Kelm | Dec. 12, 1961 |

OTHER REFERENCES

Publication I: "Rome Trimline Primary Distribution System," Electrical Construction and Maintenance, Jan. 1959, pages 62 and 63.